United States Patent [19]

Vetre

[11] Patent Number: 5,535,539
[45] Date of Patent: Jul. 16, 1996

[54] FISHING ROD HANDLE WITH EXTENSION

[76] Inventor: Bruce A. Vetre, 537 Mulbery Point Rd., Guilford, Conn. 06437

[21] Appl. No.: 309,849

[22] Filed: Sep. 21, 1994

[51] Int. Cl.⁶ ........................................... A01K 87/00
[52] U.S. Cl. ........................... 43/23; 43/18.1; 43/20
[58] Field of Search ........................... 43/23, 25, 20, 43/22, 18.1

[56] References Cited

U.S. PATENT DOCUMENTS

| | | | |
|---|---|---|---|
| 2,593,747 | 4/1952 | Godfrey | 43/23 |
| 4,084,343 | 4/1978 | Genovese | 43/23 X |
| 5,259,140 | 11/1993 | Epperson | 43/23 X |
| 5,291,683 | 3/1994 | Yamato | 43/23 X |
| 5,355,611 | 10/1994 | Dahlberg et al. | 43/25 X |
| 5,390,438 | 2/1995 | Warren, Jr. | 43/23 |

*Primary Examiner*—Richard K. Seidel
*Assistant Examiner*—Jeanne M. Elpel
*Attorney, Agent, or Firm*—Fattibene and Fattibene; Paul A. Fattibene; Arthur T. Fattibene

[57] ABSTRACT

A fishing pole or rod having a replaceable rear extension of a predetermined length. A fishing rod handle attached to a rod blank with a fixed front handle having a front reel seat incorporated therein with a threaded rear portion. A threaded extension is adapted to thread onto the rear portion of the front fixed handle. A rotatable rear reel seat is advanced forward by the threaded extension. A replaceable extension is adapted to fictionally fit the exterior diameter of the threaded extension. The replaceable extension has a length that is selected depending upon the individual user's personal preference. A plug having weights therein is placed at the open rear end of the replaceable extension that additionally facilitates the customizing of the balance and feel of the fishing rod, depending upon the individual's personal preference or desire. Therefore, a custom rod can easily be fabricated or changed quickly and inexpensively.

13 Claims, 2 Drawing Sheets

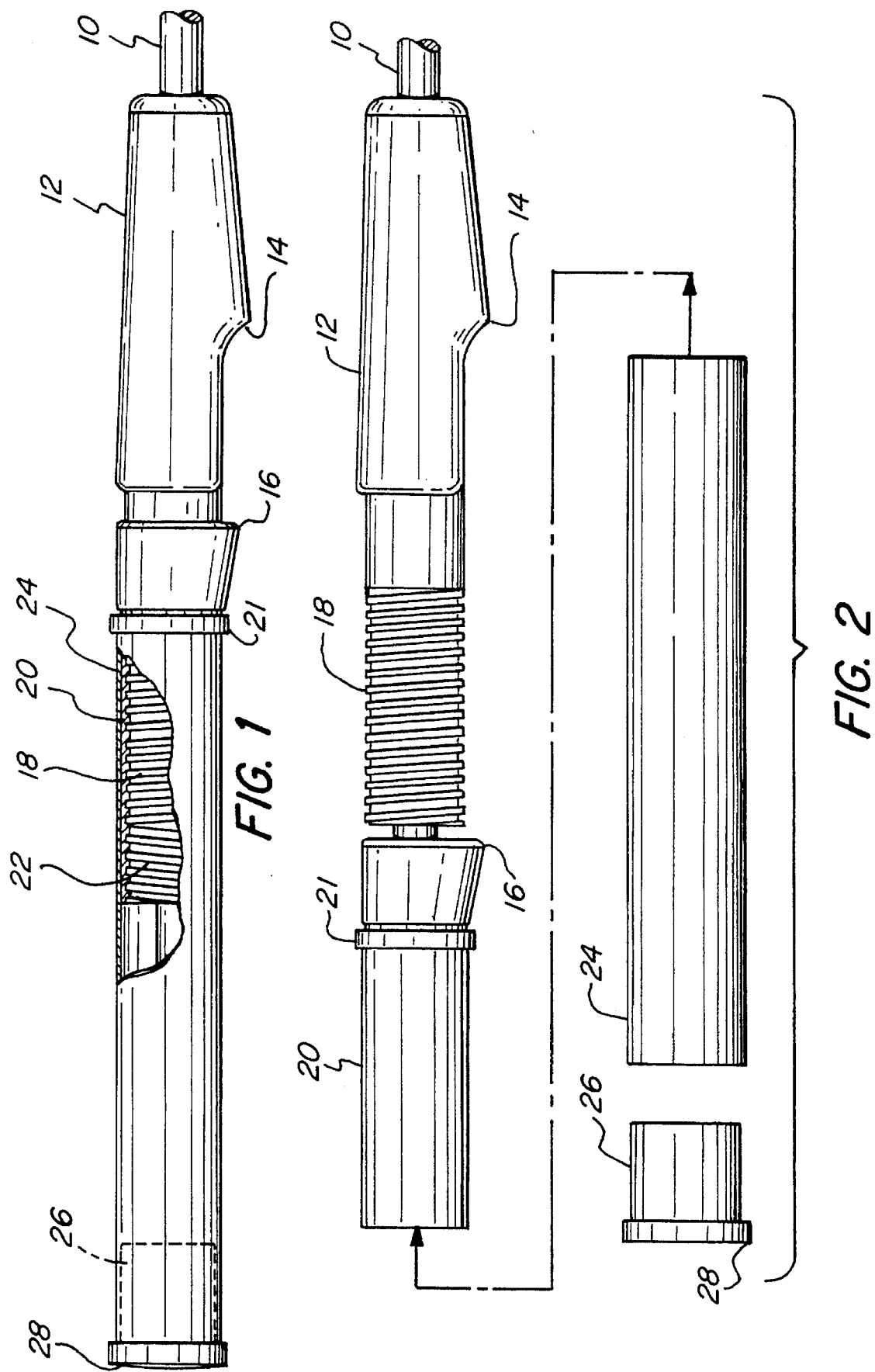

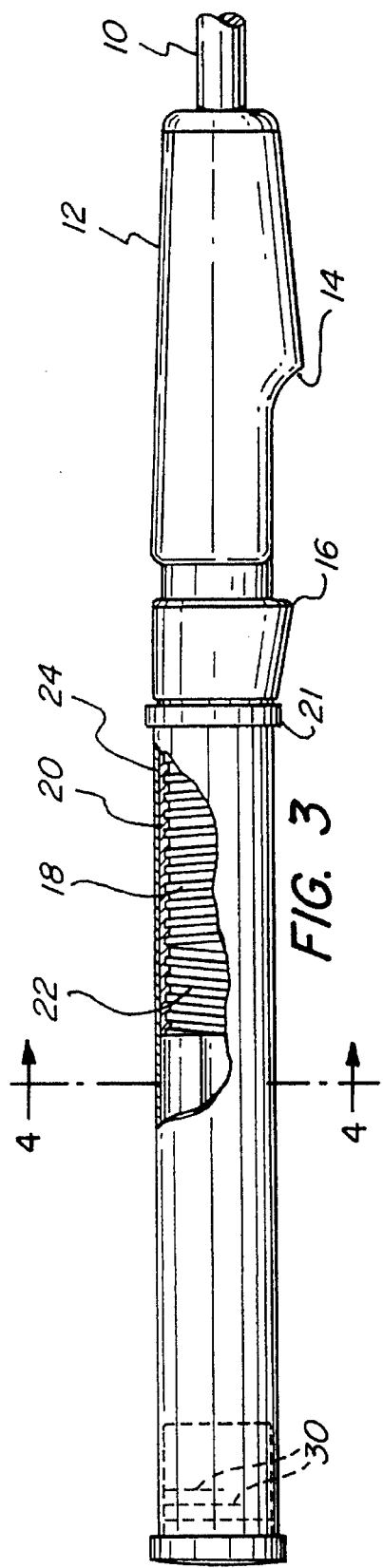
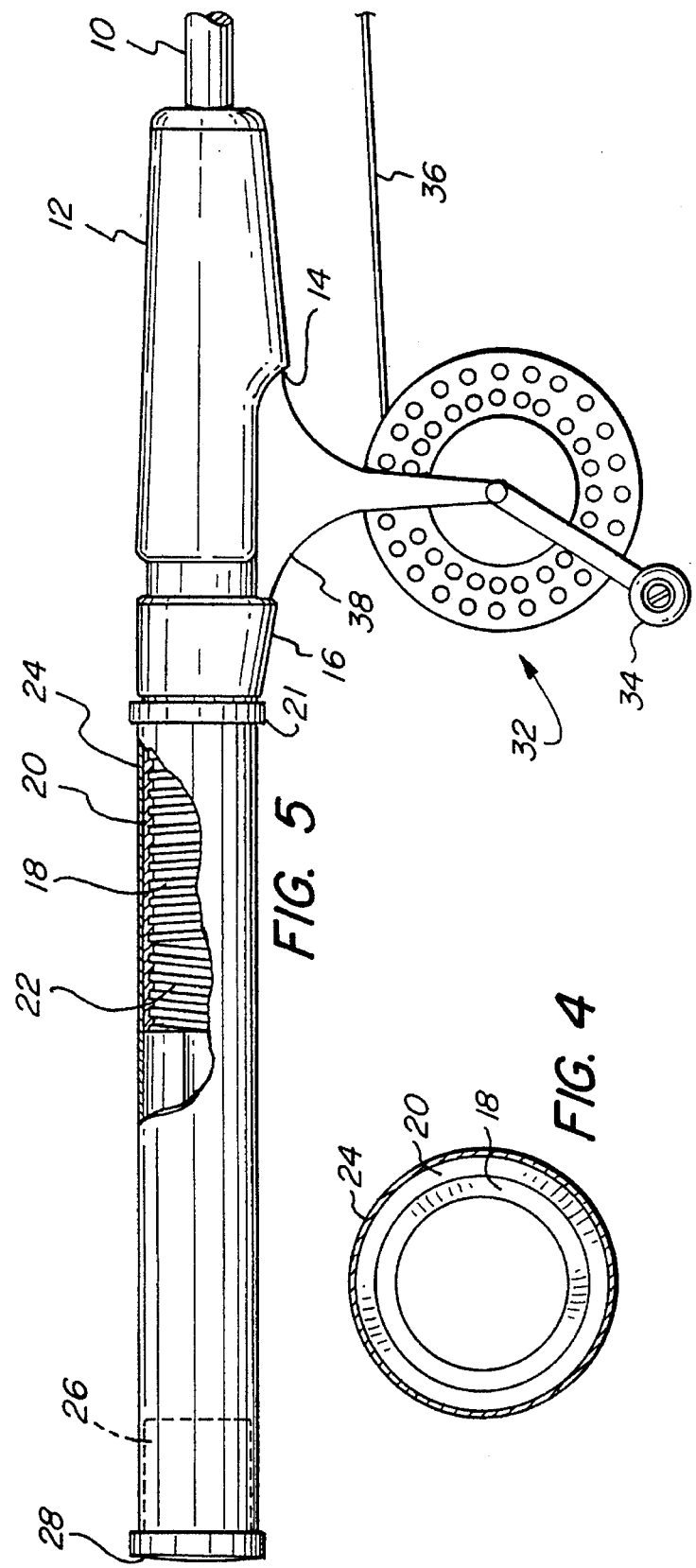
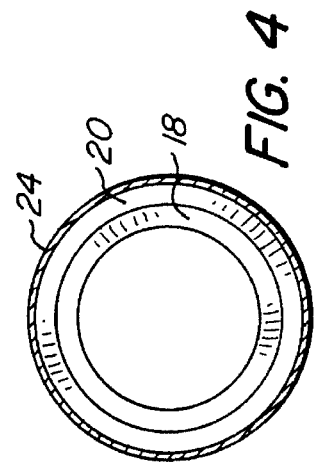

FISHING ROD HANDLE WITH EXTENSION

FIELD OF THE INVENTION

This invention relates in general to fishing rod handles, and more particularly to a fishing rod handle having a replaceable rear extension portion.

BACKGROUND OF THE INVENTION

As the popularity of the sport of fishing grows, there is an ever increasing demand to refine the sport. Mass produced rods, while economical, cannot satisfy the particular desires, technique, and styles of every individual. Therefore, there is a growing demand for custom fishing poles or rods that are custom made to an individual's particular requirements or preferences. However, because custom rods must be individually fabricated, they are often expensive and therefore, their benefits cannot be made available to the general or average individual. Typically, a custom rod once made can not be easily modified. Additionally, an individual so inclined may desire several custom rods for varying applications and types of fishing. For many individuals, this may be prohibitively expensive as well as inconvenient in the storage and care of a multitude of different rods. Often, much of the time and money spent in the customizing of a rod is a result of the design and fabrication of the handle portion of the rod. The handle portion of a rod contributes greatly to the feel and balance of the rod. The feel and balance of a rod are the primary reasons why individuals select a custom rod over a mass produced or pre-fabricated rod. It is this feel and balance of a rod that is tailored to each individual in the building of a custom rod. Accordingly, there is a need for a fishing pole handle or rod handle that can easily and inexpensively be customized for making fishing more enjoyable and affordable to a wide variety of individuals.

SUMMARY OF THE INVENTION

The fishing pole handle of the present invention comprises a rod blank attached to a fixed front handle having a front rod seat or hood. The rear portion of the front handle is externally threaded. An internally threaded rear extension and a rear reel seat or hood is placed over the threaded rear portion of the front handle. The internally threaded extension has a rear portion that is adapted to become or receive a replaceable rear extension of predetermined length. The replaceable rear extension is adapted to receive weights in the end thereof. The replaceable rear extension is easily modified in length and weight providing a custom balance and feel particular to an individual.

Accordingly, it is an object of the present invention to provide a rod that can easily and inexpensively be customized.

It is a further object of the present invention to provide a rod that has an easily changeable balance and feel.

It is an advantage of the present invention that the need for multiple different rods is reduced.

It is another advantage of the present invention that the balance and feel of a rod is easily adjusted.

It is a feature of the present invention that an replaceable rear extension is used.

It is another feature of the present invention that weights can easily be applied to the replaceable rear extension changing the balance and feel of the rod.

It is yet another feature of the present invention that an integral front reel seat is used providing better feel.

It is a further feature of the present invention that the threaded portion of the rod handle is internal, thus providing a smoother more comfortable gripping surface.

These and other objects, advantages, and features will become more readily apparent in view of the following detailed description.

BRIEF DESCRIPTION OF THE DRAWINGS

FIG. 1 is a side elevational view showing a partial section of the present invention.

FIG. 2 is an exploded view of the embodiment illustrated in FIG. 1.

FIG. 3 is a front elevational view illustrating another embodiment of the present invention.

FIG. 4 is a cross section taken along line 4—4 in FIG. 3.

FIG. 5 is a front elevational view illustrating a reel attached to the rod handle of the present invention.

DETAILED DESCRIPTION OF THE PREFERRED EMBODIMENTS

In FIG. 1, the handle portion of a fishing pole or rod is illustrated. A rod blank 10 is inserted into a front handle 12. The front handle 12 has incorporated therein a front reel seat or hood 14. The front handle 12 is preferably securely fixed to the rod blank 10. This provides for better feel. The integral structure transmits minute vibrations to the hand or finger of the individual more efficiently. The rear portion of the front handle 12 has external male threads 18 thereon. A threaded extension 20 has internal female threads 22 therein and is adapted to thread onto the male threads 18 of the fixed front handle 12. A rear reel seat or hood 16 may be attached to the threaded extension 20. The rear reel seat or hood 16 may be rotatably attached to the threaded extension 20. The rear reel seat or hood 16 may also be separate from the threaded extension 20 and placed over the male threads 18 before attaching the threaded extension 20. The threaded extension 20 has a shoulder 21 thereon. Shoulder 21 abuts against or is adjacent rear reel seat or hood 16. Threaded extension 20 has a rear outer diameter adapted or sized to fictionally fit the inner diameter of a tubular extension 24. Tubular extension 24 is a cylindrical tube having a predetermined length. The length of tubular extension 24 is customized to the individual. Tubular extension 24 may be made from a plastic or spun material and have a rubber, cork, or other like material on the exterior surface thereof as desired by an individual. The tubular extension 24 may itself be replaceable on the threaded extension 20, or the tubular extension 24 may be epoxied or permanently affixed or secured onto the threaded extension 20. This making the threaded extension 20 and tubular extension 24 assembly replaceable. The open end of tubular extension 24 is adapted to receive a plug 26 with a plug cap 28 thereon.

FIG. 3 illustrates another embodiment of the present invention. This embodiment has the same structure as that illustrated in the embodiment in FIGS. 1 and 2. However, weights 30 are placed within the end of the tubular extension 24. The weights 30 can take the form of washers or thin discs, a plurality of which are fixed in place. The weights 30 may be conveniently placed within the plug 26. The weights 30 may be press fit, secured by gluing, or attached with a screw. Accordingly, the plug 26 is easily removed and a predetermined number of weights 30 affixed therein, dependent upon the individual's desire or preference. A multitude of plugs may be prefabricated, having a range of preselected weights molded therein that could be selected by the individual and easily changed in accordance with the individual's desires or preferences.

FIG. 4 is a cross section taken along line 4—4 in FIG. 3. The structure of the fishing pole or rod handle can more clearly be seen in FIG. 4. Concentrically placed within the cylindrical tubular extension 24 is a portion of the internally threaded extension 20, as well as a portion of the external male threads 18 attached to the front handle 12. This structure provides for a very rigid, strong, and solid feel.

FIG. 5 illustrates the present invention with an attached reel 32. Reel 32 is used to take up fishing line 36 by rotating handle 34. The reel 32 is attached to the handle of the present invention by a T-bracket 38. The front end of the T-bracket 38 fits within the front reel seat or hood 14 and the rear portion of the T-bracket 38 fits within the rear reel seat or hood 16. The internally threaded extension 20 is used to secure the front and rear reel seats or hoods 14 and 16 onto the T-bracket 38. By screwing the internally threaded extension 20 onto the externally threaded portion 18 of front handle 12, the rear reel seat or hood 16 is advanced forward towards the fixed front reel seat or hood 14.

The present invention, in providing a fishing rod handle having an internally threaded extension 20 attaching to the externally threaded portion 18 at the rear of a front fixed handle 14, the threaded extension having an exterior diameter adapted to receive a tubular extension 24 of a predetermined length for easy replacement, in combination with the ability to place weights at the end thereof, greatly facilitates the ease in which a fishing pole or rod can be customized or made according to an individual's desires and preferences. This greatly reduces the cost and time required to customize a rod. Additionally, it makes it possible for the individual user to customize his own rod easily and makes possible the selection of different length handles and weight, thereby changing the balance and feel of the rod.

Although the preferred embodiments have been illustrated and described, it will be obvious to those skilled in the art that various modifications may be made without departing from the spirit and scope of this invention.

What is claimed is:

1. A fishing rod handle comprising:

a front handle connected to a rod blank, said front handle having a distal end;

a front reel seat attached to said front handle;

a rear portion of said front handle having threads;

a rear extension having threads adapted to mate with the rear portion of said front handle, said rear extension extending beyond the distal end of said front handle wherein said rear extension is moved axially by rotation of said rear extension;

a rear reel seat adjacent to said rear extension; and a tubular extension adapted to be received by a portion of said rear extension;

whereby said tubular extension is selected having a predetermined length resulting in a rod having a customized balance and feel.

2. A fishing rod handle as in claim 1 wherein:

said tubular extension is permanently affixed to said rear extension.

3. A fishing rod handle as in claim 1 wherein:

said front handle is permanently affixed to the rod blank.

4. A fishing rod handle as in claim 3 wherein:

said front reel seat is integrally incorporated into said front handle.

5. A fishing rod handle as in claim 1 wherein:

said rear portion of said front handle is externally threaded.

6. A fishing rod handle as in claim 5 wherein:

said rear extension is internally threaded.

7. A fishing rod handle as in claim 1 wherein:

the external diameter of said rear extension forms a friction fit with the internal diameter of said tubular extension.

8. A fishing rod handle as in claim 1 wherein:

said tubular extension is cylindrical.

9. A fishing rod handle as in claim 1 wherein:

said rear reel seat is rotatably connected to said rear extension.

10. A fishing rod handle comprising:

a front handle connected to a rod blank;

a front reel seat attached to said front handle;

a rear portion of said front handle having external threads extending around the entire circumference of said rear portion;

a rear extension having internal threads adapted to mate with the rear portion of said front handle;

a rear reel seat rotatably attached to said rear extension; and a tubular extension adapted to be received by a portion of said rear extension, whereby said tubular extension is selected having a predetermined length resulting in a rod having a customized balance and feel.

11. A fishing rod handle as in claim 10 wherein:

said weighted plug has replaceable weights therein.

12. A fishing rod comprising:

a rod blank;

a front handle permanently connected to said rod blank;

a front reel seat integrally attached to said front handle;

a cylindrical rear portion of said front handle having external threads;

a cylindrical rear extension having internal threads adapted to mate with the external threads of the rear portion of said front handle;

a rear reel seat rotatably mounted on one end of said rear extension;

an outwardly extending shoulder placed on said rear extension and adjacent said rear rod seat;

a cylindrical tubular extension having an open front end and an open rear end, the open front end of said cylindrical tubular extension adapted to be received by a portion of said cylindrical rear extension and permanently affixed thereto;

a plug attached to the open rear end of said cylindrical tubular extension; and a weight placed within and attached to said plug, whereby said cylindrical tubular extension is selected having a predetermined length resulting in a rod having a customized balance and feel, and said cylindrical rear extension with permanently affixed cylindrical tubular extension is easily replaceable by unthreading it from said cylindrical rear portion of said front handle.

13. A fishing rod comprising:

a rod blank;

a front handle permanently connected to said rod blank;

a front reel seat integrally attached to said front handle;

a cylindrical rear portion of said front handle having external threads;

a cylindrical rear extension having internal threads adapted to mate with the external threads of the rear portion of said front handle;

a rear reel seat rotatably mounted on one end of said rear extension;

an outwardly extending shoulder placed on said rear extension and adjacent said rear reel seat;

a cylindrical tubular extension having an open front end and an open rear end, the open front end of said cylindrical tubular extension adapted to be received by a portion of said cylindrical rear extension and affixed thereto; and a plug attached to the open rear end of said cylindrical tubular extension;

whereby said cylindrical tubular extension is selected having a predetermined length resulting in a rod having a customized balance and feel, and said cylindrical rear extension with affixed cylindrical tubular extension is easily replaceable by unthreading it from said cylindrical rear portion of said front handle.

* * * * *